US009621728B2

(12) United States Patent
McCormack et al.

(10) Patent No.: US 9,621,728 B2
(45) Date of Patent: Apr. 11, 2017

(54) SYSTEM AND METHOD FOR PRIORITIZING AGENT INTERVENTION INTO AUTOMATED CUSTOMER ENGAGEMENTS

(71) Applicant: Avaya Inc., Basking Ridge, NJ (US)

(72) Inventors: Tony McCormack, Galway (IE); Neil O'Connor, Galway (IE); Paul D'Arcy, Caherconlish (IE); Paul Denby, County Galway (IE)

(73) Assignee: Avaya Inc., Basking Ridge, NJ (US)

( * ) Notice: Subject to any disclaimer, the term of this patent is extended or adjusted under 35 U.S.C. 154(b) by 330 days.

(21) Appl. No.: 14/051,932

(22) Filed: Oct. 11, 2013

(65) Prior Publication Data

US 2015/0103995 A1    Apr. 16, 2015

(51) Int. Cl.
*H04M 3/51*        (2006.01)
(52) U.S. Cl.
CPC ....... *H04M 3/5191* (2013.01); *H04M 3/5166* (2013.01); *H04M 3/5175* (2013.01)

(58) Field of Classification Search
CPC .... H04M 3/51; H04M 3/5191; H04M 3/5183; H04M 3/5233; H04M 2203/408; H04M 2203/2061
USPC ............ 379/265.02, 265.05, 265.09, 265.12, 379/265.13
See application file for complete search history.

(56) References Cited

U.S. PATENT DOCUMENTS

| | | | |
|---|---|---|---|
| 8,379,830 B1 * | 2/2013 | Naik et al. ............... | 379/265.02 |
| 2011/0141919 A1 * | 6/2011 | Singh et al. .................. | 370/252 |

* cited by examiner

*Primary Examiner* — Antim Shah

(57) ABSTRACT

A system for prioritizing intervention of live agents into automated customer engagements in a communication system is disclosed. The system includes an intervention prioritization module configured to identify a live agent to intervene into an automated customer engagement in a communication system based on a confidence factor corresponding to the automated customer engagement and one or more live agent attributes corresponding to the live agent. The system further includes a live agent conference module configured to cause the identified live agent to intervene into the automated customer engagement.

20 Claims, 3 Drawing Sheets

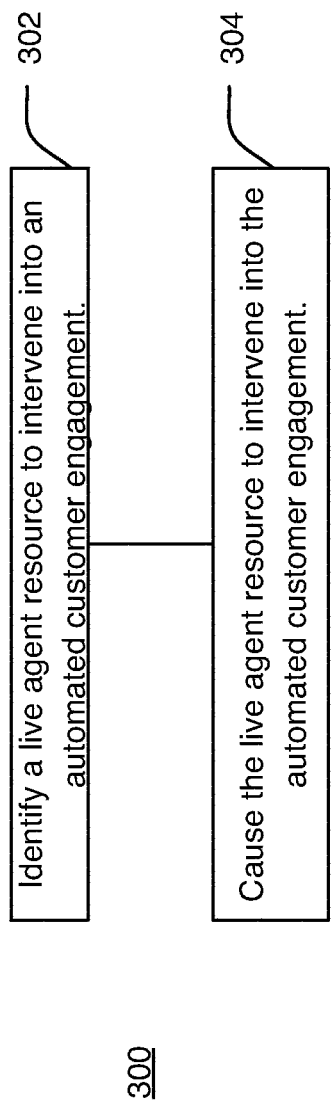

SYSTEM AND METHOD FOR PRIORITIZING AGENT INTERVENTION INTO AUTOMATED CUSTOMER ENGAGEMENTS

BACKGROUND

Field of the Invention

Embodiments of the present invention generally relate to a system and method for prioritizing agent intervention into automated customer engagements in a communication system. More specifically, embodiments of the present invention provide a system and method for managing and prioritizing agent intervention into automated engagements with customers in a contact center.

Description of Related Art

Companies may provide for customers to be engaged without the use of a human operator. For example, companies may provide automated instant message features on their websites to allow customers to ask questions without the need to provide live human operators (referred to as "live agents") to answer the questions. That is, live agents are not needed to respond to the customer's queries; instead the responses are automatically generated by an automated engagement system. In this manner, companies can both service a larger number of customers and reduce the amount of live agents needed to engage with customers.

Automated engagement systems rely on natural language processing to determine what the customer is requesting and provide an answer. In addition to providing an answer to the customer's query, automated chat systems may generate a confidence factor. The confidence factor corresponds to the level of "confidence" that the automated engagement system has in its answer. Said differently, the confidence factor corresponds to how closely the automated engagement system believes it understood the customer query and how closely it believes its answer corresponds to what the customer is looking for. For example, if a customer's responses do not correspond to a pattern expected by the automated engagement system, it may follow that there is low probability that the automated customer engagement will provide a satisfactory experience for the customer. Therefore, the confidence factor may be relatively low. In such cases, a live agent may be able to better serve the interests of both the customer and the company.

In order to ensure customer satisfaction with the automated customer engagement, a live agent may be brought into the engagement when the confidence factor falls below a threshold value. Administrators (e.g., contact center supervisors, or the like) of the automated engagement system can adjust the threshold at which live agents intervene in automated customer engagements. However, this is difficult to do continually and in such a manner as to reflect the relative availability or scarcity of live agents within the system. Particularly, as the availability or scarcity of live agents can change rapidly due to demand. Furthermore, adjusting the confidence factor threshold in such a manner fails to take into account information about the proficiency of individual live agents so that the live agent brought into an automated customer engagement is best suited among available live agents to achieve a satisfactory resolution. Due to the difficulty of dynamically adjusting the confidence factor threshold, many conventional systems employ a static confidence factor threshold at which live agents intervene in automated customer engagements.

Thus there is a need for a system and method for managing and prioritizing live agent intervention into automated customer engagements.

SUMMARY

Embodiments in accordance with the present invention provide a system for prioritizing intervention of live agents into automated customer engagements in a communication system. The system including an intervention prioritization module configured to identify a live agent to intervene into an automated customer engagement in a communication system based on a confidence factor corresponding to the automated customer engagement and one or more live agent attributes corresponding to the live agent, and a live agent conference module configured to cause the identified live agent to intervene into the automated customer engagement.

Embodiments in accordance with the present invention further provide a computer-implemented method for prioritizing intervention of live agents into automated customer engagements in a communication system. The computer-implemented method includes identifying a live agent to intervene into an automated customer engagement in a communication system based on a confidence factor corresponding to the automated customer engagement and one or more live agent attributes corresponding to the live agent, and causing the identified live agent to intervene into the automated customer engagement.

Embodiments in accordance with the present invention further provide a computer readable medium storing computer readable instructions when executed by a processor perform a method that includes identifying a live agent to intervene into an automated customer engagement in a communication system based on a confidence factor corresponding to the automated customer engagement and one or more live agent attributes corresponding to the live agent, and causing the identified live agent to intervene into the automated customer engagement.

The present invention can provide a number of advantages depending on a particular configuration. First, embodiments of the present invention provide an adaptive mechanism that uses strategic Avaya Aura® and/or Avaya Experience Manager® to prioritize agent intervention into automated customer engagements. Although Avaya® systems and technologies are used in this application, it should understood by one of ordinary skill in the art that any communications platform or for that matter contact center platform that supports unified communications and contact center solutions is contemplated by the present invention and that the Avaya systems are used by way of example only and for simplicity of explaining embodiments of the present invention.

Next, embodiments of the present invention prioritize agent intervention into automated customer engagements by dynamically adjusting a confidence factor threshold. For example, if sufficient live agents are available, a live agent can be brought into an automated customer engagement even when there is a relatively high confidence factor. As another example, when live agents are scarce a live agent may only be brought in an automated customer engagement when the confidence factor is low.

In some embodiments, the confidence factor can be used to determine which proficiencies an agent needs in order to resolve an engagement and how long a customer can be allowed to wait for the support of a live agent.

Accordingly, embodiments of the present disclosure may ensure that live agents in the contact center are optimally utilized. Furthermore, live agents may selected to intervene in the most appropriate automated customer engagements, rather than merely in reaction to a below threshold confidence factor.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein:

FIG. 3 is a flowchart of a method for prioritizing intervention of live agents into automated customer engagements, in accordance with an embodiment of the present invention.

Figure 1:
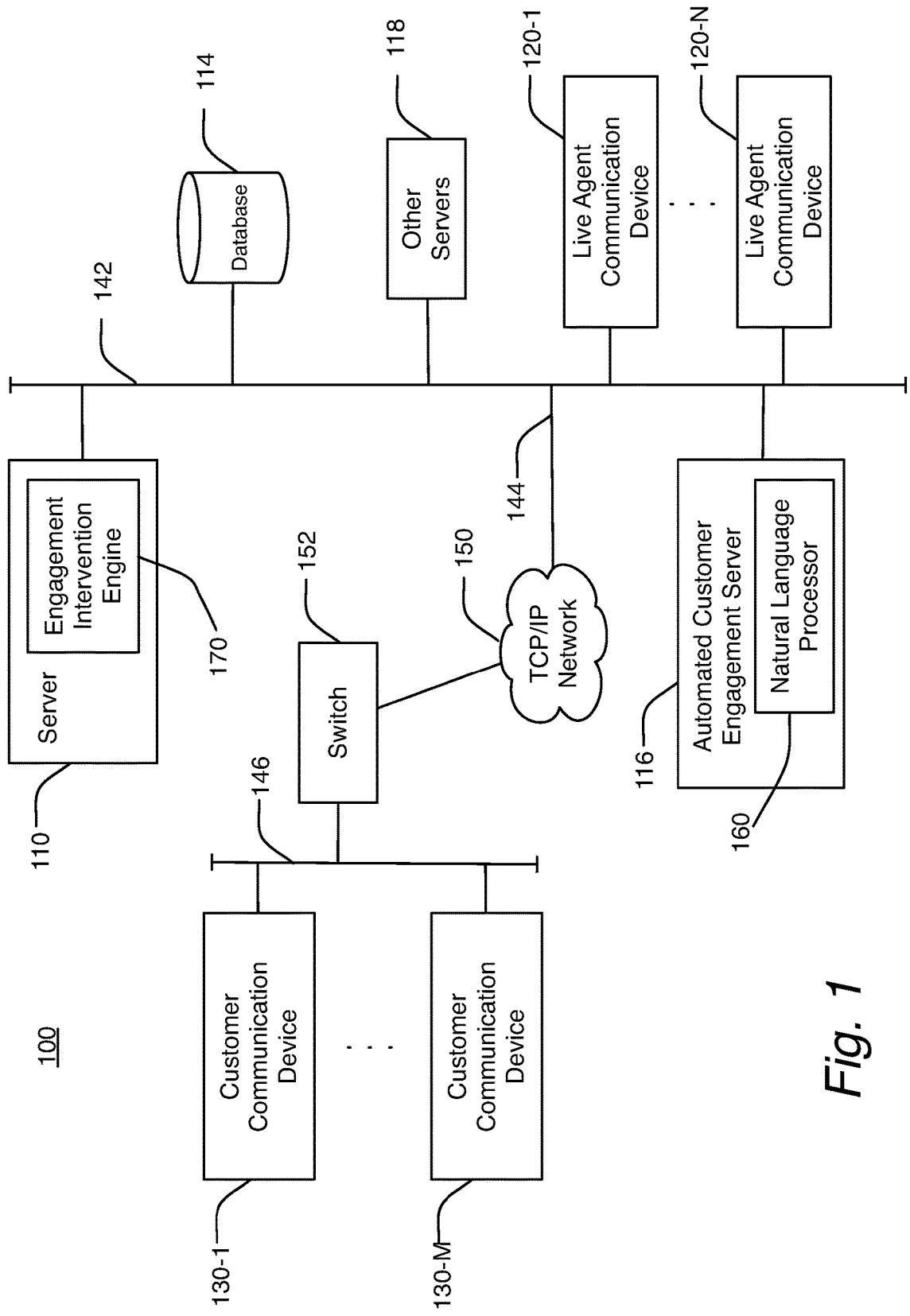
FIG. 1 is a block diagram depicting an illustrative communication system according to an embodiment of the present invention.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The term "chat session" as used herein should be understood to include any type of text based two way communication, such as, instant messaging, text messaging, or the like. Additionally, the term "chat session" as used herein shall be understood to include any type of voice based two way communication, such as, for example, telephone conversations, automated voice systems, speech to text systems, or the like. Furthermore, although many of the examples herein reference "chat sessions" in the context of instant messaging sessions, it is to be understood that the examples may be applicable to voice based communications also. As such, the examples, like all examples described herein, are not intended to be limiting.

The present invention will be illustrated below in conjunction with an exemplary communication system, e.g., the Avaya Aura® and/or the Avaya Experience Manager® systems. Although well suited for use with, e.g., a system having automated customer engagement hardware and/or software, the present invention is not limited to any particular type of communication system or configuration of system elements. Those skilled in the art will recognize the disclosed techniques may be used in any communication application in which it is desirable to provide improved assignment of monitoring customer-agent interactions.

FIG. 1 shows an illustrative communication system in which the present invention may be implemented. The communion system is illustrated using an example contact center 100, which comprises a server 110 (described in greater detail below), a set of data stores or databases 114 containing automated customer engagement and/or live agent related information and/or other information that can enhance the value and efficiency of the prioritization of live agent intervention into automated customer engagements, and a plurality of servers, namely an automated customer engagement server 116, and other servers 118, a number of live agent communication devices 120-1 to 120-N (such as computer work stations, personal computers, smart phones, tablet computers, or the like), and a number of customer communication devices 130-1 to 130-M, all interconnected by a communication network 142 that may be a local area network (LAN), a wide area network (WAN), or the Internet, all of which are generically referred to herein as WAN 142. The servers can be connected via communication lines 144 to a TCP/IP Network 150. The computing devices can be connected via communication lines 146 to the switch 152. The network 150 is connected via switch 152 to process communication passing between the servers, live agent communication devices, and the customer communication devices.

The live agent communication devices 120-1 to 120-N are network connectable and can generally include any of the computing devices as defined above. In more specific examples, the live agent communication devices 120-1 to 120-N can include a tablet computer, a smart phone, or generally, any type of network connectible computer system that can be used to engage in chat sessions.

Similarly, the customer communication devices 130-1 to 130-M are network connectable and can generally include any of the computing devices as defined above. In more specific examples, the customer communication devices 130-1 to 130-M can include a tablet computer, a smart phone, or generally, any type of network connectible computer system that can be used to engage in chat sessions.

The network 150 can be any data and/or distributed processing network, such as the Internet. The network 150 typically includes proxies (not shown), registrars (not shown), and routers (not shown) for managing data flow.

The switch 152 can be any network connection interface, router, and/or modem configured to provide data processing between the customer communication devices 130 and the network 150. For example, the switch 152 may be a cable modem, a DSL modem, a wired or wireless router, or a wireless data access point (e.g., a 3G or 4G wireless data access point, or the like).

It should be noted the present invention does not require any particular type of information transport medium between modem or server and computing devices, i.e., the present invention may be implemented with any desired type of transport medium as well as combinations of different types of transport channels.

It should be emphasized the configuration of the switch, server, user communication devices, and other elements as shown in FIG. 1 is for purposes of illustration only and should not be construed as limiting the present invention to any particular arrangement of elements. For example, a single switch 152 and network 150 is shown connecting customer communication devices 130 to WAN 142. It is to be appreciated, however, that the customer communication devices 130 may connect to the WAN 142 via any number and/or configuration of switches and networks.

During operation, the contact center 100, through the automated customer engagement server 116, provides for the automated engagement of customers via chat sessions. That is, customers contacting the contact center 100 via customer communication devices 130 may be engaged in chat sessions without a live agent generating responses to customer queries. The automated customer engagement server 116 is configured to receive text queries from the customer communication devices 130 and provide text responses to the customer communication devices 130. The automated customer engagement server 116 includes a natural language processor 160. The natural language processor 160 is configured to parse the received text queries and generate the text responses. The methods and systems employed by the natural language processor are beyond the scope of this disclosure. Various techniques for implementing a natural language processor in the context of providing automated customer engagements however, are known. Any of these techniques may be used to implement the natural language processor 160.

During the course of an automated customer engagement, the automated customer engagement server 116 generates a confidence factor related to the automated customer engagement. As stated above, the confidence factor corresponds to the level of "confidence" that the automated customer engagement server has in the text responses generated as part of the automated customer engagement. Said differently, the confidence factor corresponds to how closely the automated customer engagement server believes it understood the customer's text query and how closely it believes its generated text response corresponds to what the customer is looking for. For example, if a customer's responses do not follow the pattern expected by the automated customer engagement server, the server may determine there is low confidence that the automated customer engagement will provide a satisfactory experience for the customer and may generate a correspondingly low confidence factor.

In general, the confidence factor may have an arbitrary range of values. Furthermore, it is noted that the confidence factor corresponding to an automated customer engagement may change as the engagement progresses and may be based on the entirety of the chat session, recent portions of the chat session, or in general, any portion of the chat session that allows the automated engagement server to generate a meaningful confidence factor.

As depicted in FIG. 1, the server 110 includes an engagement intervention engine 170. The engagement intervention engine 170 is configured to prioritize the intervention of live agents (e.g., operating the live agent communication devices 120-1 to 120-N) into some of the above described automated customer engagements. In particular, the engine 170 is configured to cause live agents (e.g., operating live agent devices 120-1 to 120-N) to intervene into automated customer engagements based on the confidence factors of each of the automated customer engagements. Furthermore, in some examples, the prioritization may be based on one or more strategy rules (described below) are shown.

Figure 2:
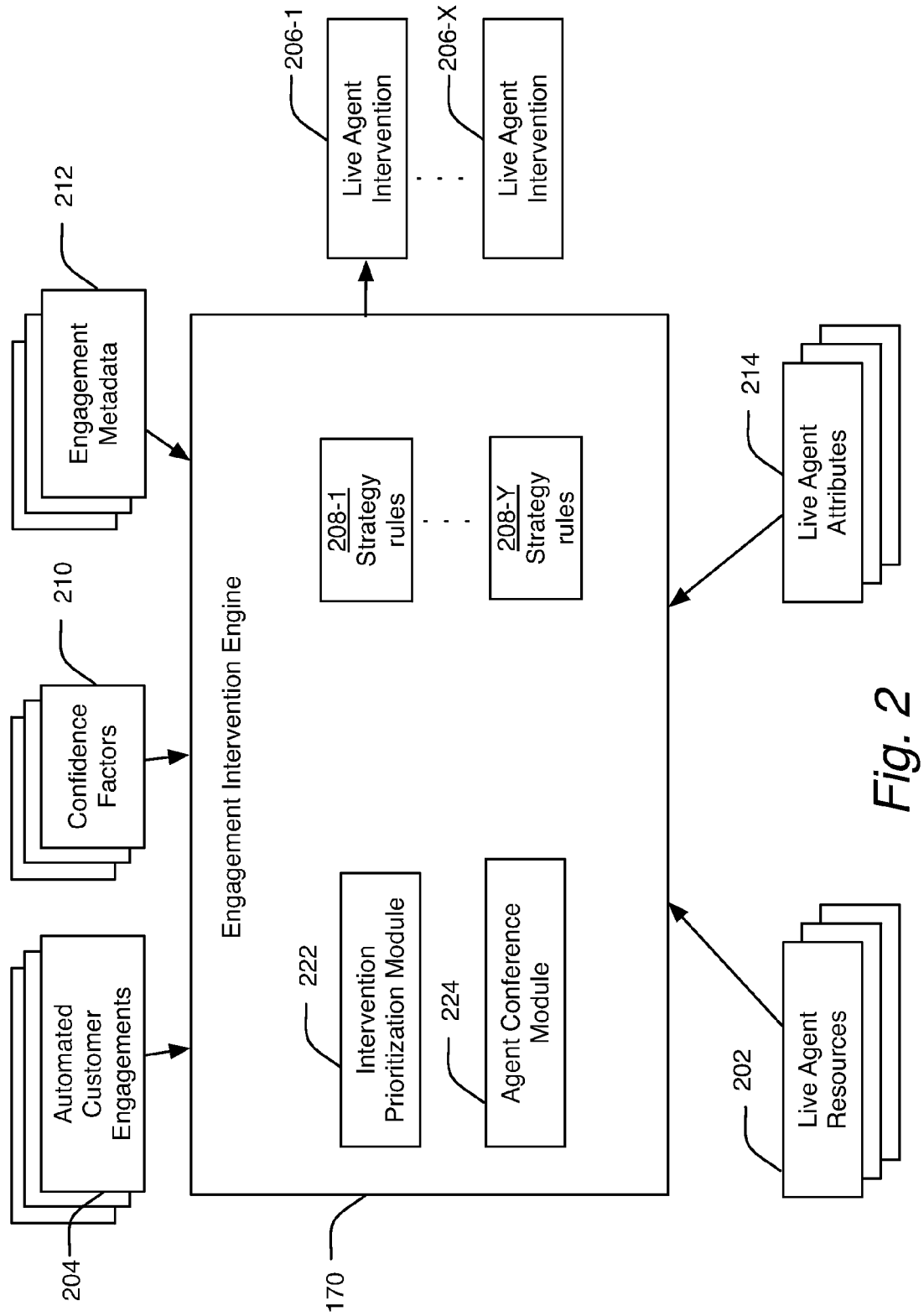
FIG. 2 is a block diagram of an engagement intervention engine according to an embodiment of the present invention.

FIG. 2 illustrates an embodiment of the engagement intervention engine 170. As depicted, the engine 170 is configured to prioritize the intervention of live agents 202 into one or more of the automated customer engagements 204. In particular the engine 170 is configured to identify a live agent to intervene into one of the automated customer engagements and cause the identified live agent to intervene into the automated customer engagement. It is to be appreciated, that during operation of the contact center 100, the engine 170 may repeatedly identify and cause live agents to intervene into automated customer engagements, corresponding to the number of live agent interventions 206-1 to 206-X.

As depicted, the engine 170 includes an intervention prioritization module 222 and an agent conference module 224. Furthermore, a number of strategy rules 208-1 to 208-Y (described in greater detail below).

The intervention prioritization module 222 is configured to both identify an automated customer engagement 204 that a live agent should intervene into and also identify one of the live agents 202 to intervene into the identified automated customer engagement 204.

In some examples, the intervention prioritization module 222 identifies an automated customer engagement based on confidence factors 210 associated with each of the automated customer engagements 204. As described above, the automated engagement server 116 may generate confidence factors for the automated engagements that it is providing, these confidence factors may be provided to the engine 170 (e.g., as inputs), which the engine 170 may use to determine the automated customer engagements to intervene into. The module 222 may identify an automated customer engagement for intervention based on the confidence factors and one or more of the strategy rules 208. For example, the strategy rules may specify that if live agents 202 are available, increase a confidence factor threshold used to identify automated customer engagements for intervention. Said differently, the confidence factor threshold may be dynamically adjusted by the module 222 based on the confidence factors, availability of agents, agent attributes, and/or engagement metadata. As a more specific example, the module 222 may dynamically adjust the confidence factor threshold based on the availability of a plurality of live agents. For example, as indicated, if the availability of agents is high (e.g., agents are not scarce) the confidence factor threshold may be lowered. Similarly, if the availability of agents is low (e.g., agents are scarce) the confidence factor threshold may be raised.

In some examples, the intervention prioritization module 222 identifies an automated customer engagement 204 based on "metadata" associated with each of the automated customer engagements. As depicted, engagement metadata 212 is shown as an input into the engine 170. In some examples, the metadata 212 may include information that describes each of the automated customer engagements, such as, engagement language, engagement subject matter, relevant customer information, or the like. Accordingly, the engine 170 may identify automated customer engagements to intervene into based on the engagement metadata 212. For example, specific customers (e.g., those who have made a prior purchase, high value customers, or the like) may have their automated customer engagements selected for intervention prior to other customers.

As stated, the intervention prioritization module 222 also identifies live agents to intervene into the identified automated customer engagements. In some examples, the module 222 identifies live agents based on live agent attributes 214 corresponding to each of the live agents. The live agent attributes 214 may include skill, proficiencies, and/or other characteristics describing the live agents For example, the live agent attributes 214 may include language(s) with which the live agent is qualified to engage customers in, products and/or departments with which the live agent is trained, a proficiency of the live agent in providing satisfactory customer experiences, or the like.

In some examples, the intervention prioritization module 222 may identify live agents based on the confidence factor and/or the live agent attributes. For example, a live agent having a high proficiency, or multiple skills may be identified to intervene in an automated customer engagement with a relatively low confidence factor. Said differently, a relatively low confidence factor may indicate a lack of clarity into the nature of the customers query. As such a multi skilled and/or high proficiency live agent may have a better chance of providing a satisfactory experience for the customer.

In some examples, the intervention prioritization module 222 may use various matching techniques (e.g., based on the strategy rules 208) to select the most appropriate available live agent based on the engagement metadata 212 and the live agent attributes 214. For example, where a surplus of live agents 202 are available, the best available live agent may be selected using standard matching strategies (e.g., least occupied, best fit, or the like).

In some examples, where a suitably matched live agent is not available, the intervention prioritization module 222 may determine how to handle the automated customer engagement based on the confidence factors and/or the engagement metadata.

For example, if the confidence factor is low and the expected wait short, the intervention prioritization module 222 may cause the automated engagement server 116 to generate a text response such as "Please hold on a moment. I'd like to bring in an expert to look at this" and select the next suitable live agent that becomes available.

As another example, if the confidence factor is low and the expected wait long, the intervention prioritization module 222 may cause the automated engagement server 1161 to continue the engagement as configured but interrupt the planned progress if a suitable live agent does become available.

As another example, if the confidence factor is high and the expected wait long, the intervention prioritization module 222 may cause the automated engagement server 116 to continue the engagement without the need to intervene.

It is to be appreciated, that the confidence factor 210 corresponding to an automated customer engagement may be updated during the course of the engagement. Furthermore, the availability of live agents 202 may also change during operation of the engine 170. As such, the intervention prioritization module 222 may repeatedly (e.g., periodically, at random intervals, as prompted by an updated input, or the like) identify a live agent to intervene into an automated customer engagement. As such, automated customer engagements that were previously not identified for intervention may subsequently be identified.

The engagement intervention engine 170 may further be configured to cause the identified live agent to intervene into the identified automated customer engagement. The agent conference module 224 may be configured to pass the automated customer engagement from the automated engagement server 116 to the live agent communication device 120 corresponding to the identified live agent. In some examples, the agent conference module 224 may be configured to pass the automated customer engagement without the customer's knowledge. In some examples, the agent conference module 224 may be configured to pass the automated customer engagement and inform the customers that the engagement has been passed. The agent conference module 224 may, for example, generate a text response such as "I have called in [Agent Name], who is an expert at responding to your question and will be assisting you from this point on." This text response can then be transmitted to the customer communication device as the engagement is passed.

In some examples, the module 224 may be configured to cause the agent to intervene into the automated customer engagement by having the live agent "assist" the automated engagement server 116. Said differently, the live agent may provide responses to and/or otherwise direct the automated engagement server 116. For example, the live agent may edit responses from the automated engagement server before they are transmitted to the customer. As such, the automated engagement server 116 may continue to provide responses to the customer as part of the automated customer engagement; however, the responses may be directed by or otherwise assisted by the live agent. In some examples, the customer may not be aware that the live agent has intervened to assist in the automated customer engagement. Additionally, the automated engagement server may be used to assist the live agent by providing suggested answers to the live agent.

FIG. 3 is a flowchart of a method 300 for prioritizing intervention of live agents into automated customer engagements in a communication system. Although the method 300 is described with reference to the engine 170 and the contact center 100, this is not intended to be limiting. At step 302, identify a live agent to intervene into an automated customer engagement; the intervention prioritization module 222 identifies a live agent from the live agents 202 to intervene into an automated customer engagement 204.

In some example, at step 302 the module 222 identifies both an automated customer engagement 204 that a live agent should intervene into and also identifies one of the live agents 202 to intervene into the identified automated customer engagement 204. The identification of the automated customer engagement and live agent may be made based on the confidence factors 210, the engagement metadata 212, the live agent attributes 214, and one or more of the strategy rules 208.

At step 304, cause the live agent to intervene into the automated customer engagement; the agent conference module 224 passes the automated customer engagement from the automated engagement server 116 to the live agent communication device 120 corresponding to the identified live agent.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for prioritizing intervention of live agent communication devices into automated customer engagements in a communication system comprising a contact center, the system comprising:
   a first server including a processor coupled to memory, wherein the processor executes program code stored in the memory to:
   dynamically adjust a confidence factor threshold associated with an automated customer engagement, based on an availability of live agents in a pool of live agents;
   identify an available live agent from the pool of live agents to intervene into the automated customer engagement based on a confidence factor corresponding to the automated customer engagement, and the confidence factor threshold; and
   selectively implement a first configuration where a live agent communication device associated with the identified live agent intervenes with the automated customer engagement, wherein the automated customer engagement provides responses that are at least one of directed by, and assisted by, the identified live agent operating the associated live agent communication device, such that a customer associated with the customer engagement is unaware of the live agent intervention; and
   a second server that executes program code stored in memory to:
   receive the automated customer engagement; and
   generate the confidence factor threshold in response to the received automatic customer engagement;
   wherein the first server dynamically adjusts the confidence factor threshold by updating the confidence factor threshold generated by the second server.

2. The system of claim 1, wherein the automated customer engagement is an automated chat session.

3. The system of claim 1, wherein the automated customer engagement is a select one automated customer engagement of a plurality of automated customer engagements, wherein:
   the processor executes further program code stored in memory to:
   identify the select one automated customer engagement based on a plurality of confidence factors related to each of the plurality of automated customer engagements and one or more strategy rules.

4. The system of claim 1, wherein:
   the processor executes further program code stored in memory to:

identify the live agent based on engagement metadata related to each of the plurality of automated customer engagements.

5. The system of claim 1, wherein the engagement metadata includes at least one of a domain of the engagement or a customer metric.

6. The system of claim 1, wherein:
the processor executes further program code stored in memory to:
identify the available live agent from the pool of live agents to intervene into the automated customer engagement based on at least one live agent attribute; and
the at least one live agent attribute includes at least one of a domain of the live agent or a proficiency of the live agent.

7. The system of claim 1, wherein:
the processor executes further program code stored in memory to:
identify the available live agent from the pool of live agents to intervene into the automated customer engagement based on at least one strategy rule; and
the at least one strategy rule includes at least one of a desired utilization of live agents or an optimal confidence factor threshold.

8. The system of claim 1, further comprising:
an automated engagement system that provides the automated customer engagement by engaging a customer communication device of the customer in an automated chat session; and
a natural language processor that receives textual queries from the customer communication device and provides textual responses to the customer communication device;
wherein:
the processor executes further program code stored in memory to:
determine the confidence factor based on the textual queries received by the natural language processor and the textual responses provided by the natural language processor.

9. The system of claim 8, wherein:
the processor executes further program code stored in memory to:
implement a second configuration where the identified live agent communication device intervenes by passing a communication between a customer communication device operated by the customer and the live agent communication device of the identified live agent such that the customer is aware of the identified live agent.

10. A computer-implemented method for prioritizing intervention of live agents into automated customer engagements in a communication system comprising a contact center, the method comprising:
adjusting dynamically, by a processor on a first server, a confidence factor threshold associated with an automated customer engagement, based on an availability of live agents in a pool of live agents;
receiving by a second server, the automated customer engagement;
generating by the second server, the confidence factor threshold in response to the received automatic customer engagement, wherein the first server dynamically adjusts the confidence factor threshold by updating the confidence factor threshold generated by the second server;

identifying, by the processor, an available live agent from the pool of live agents to intervene into the automated customer engagement based on a confidence factor corresponding to the automated customer engagement, and the confidence factor threshold; and
executing by the processor, a first configuration where a live agent communication device associated with the identified live agent intervenes with the automated customer engagement, wherein the automated customer engagement provides responses that are at least one of directed by, and assisted by, the identified live agent operating the associated live agent communication device, such that a customer associated with the customer engagement is unaware of the live agent intervention.

11. The computer-implemented method of claim 10, further comprising implementing the automated customer engagement as an automated chat session.

12. The computer-implemented method of claim 10, wherein the automated customer engagement is a select one automated customer engagement of a plurality of automated customer engagements, the method further comprising identifying the select one automated customer engagement based on a plurality of confidence factors related to each of the plurality of automated customer engagements and at least one strategy rule.

13. The computer-implemented method of claim 10, further comprising identifying the live agent based on engagement metadata related to each of a plurality of automated customer engagements.

14. The computer-implemented method of claim 10, further comprising defining engagement metadata to include at least one of a domain of the engagement or a customer metric.

15. The computer-implemented method of claim 10, further comprising defining live agent attributes to include at least one of a domain of the live agent or a proficiency of the live agent.

16. The computer-implemented method of claim 10, further comprising defining the a strategy rule to include at least one of a desired utilization of live agents or an optimal confidence factor threshold.

17. The computer-implemented method of claim 10, further comprising:
automatically engaging a customer in the automatic customer engagement by engaging a communication device of the customer in an automated chat session;
receiving a textual query from the customer communication device; and
generating a textual response that is communicated to the customer communication device.

18. The computer-implemented method of claim 17, wherein causing the identified live agent to intervene into the automated customer engagement comprises implementing a second configuration where the identified live agent intervenes by passing a communication between the customer communication device of the customer and the live agent communication device of the identified live agent such that the customer is aware of the identified live agent.

19. The computer-implemented method of claim 17, further comprising determining a confidence factor based on the textual query and the textual response.

20. Computer readable hardware storing computer readable instructions that when executed by a processor perform:
adjusting dynamically, by the processor on a first server, a confidence factor threshold associated with an automated customer engagement, based on an availability of live agents in a pool of live agents;

receiving by a second server, the automated customer engagement;

generating by the second server, the confidence factor threshold in response to the received automatic customer engagement, wherein the first server dynamically adjusts the confidence factor threshold by updating the confidence factor threshold generated by the second server;

identifying an available live agent from the pool of live agents to intervene into an automated customer engagement based on a confidence factor corresponding to the automated customer engagement, and the confidence factor threshold; and implementing, selectively, a first configuration where a live agent communication device associated with the identified live agent intervenes with the automated customer engagement, wherein the automated customer engagement provides responses that are at least one of directed by, and assisted by, the identified live agent operating the associated live agent communication device, such that a customer associated with the customer engagement is unaware of the live agent intervention.

* * * * *

UNITED STATES PATENT AND TRADEMARK OFFICE
CERTIFICATE OF CORRECTION

PATENT NO.        : 9,621,728 B2
APPLICATION NO.   : 14/051932
DATED             : April 11, 2017
INVENTOR(S)       : Tony McCormack et al.

It is certified that error appears in the above-identified patent and that said Letters Patent is hereby corrected as shown below:

In the Claims

Column 14, Line 40, "comprising defining the a strategy rule" should read --comprising defining a strategy rule--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*